June 30, 1953     J. B. PARSONS     2,644,121
SOLENOID CONTROLLED VALVE UNIT
Filed June 16, 1949
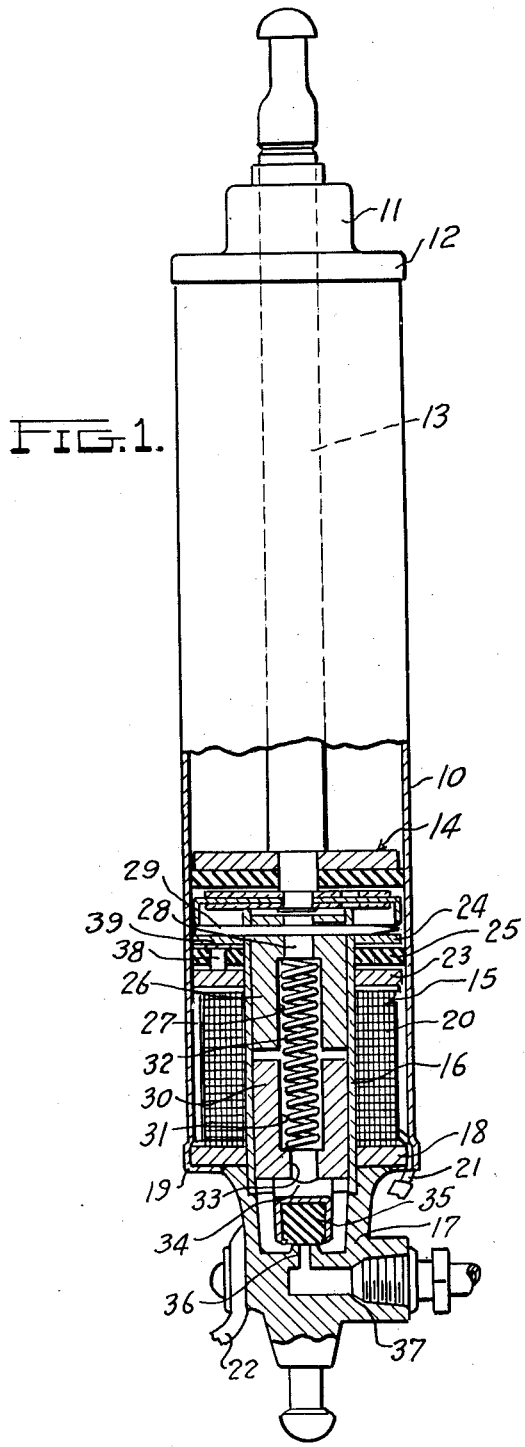
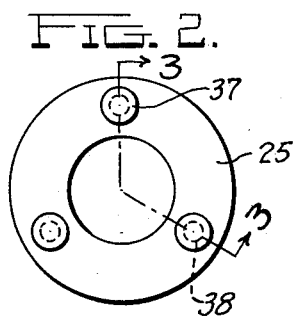
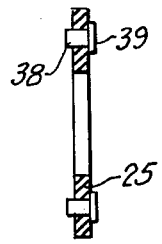
INVENTOR.
John B. Parsons
BY
ATTORNEY Patented June 30, 1953

2,644,121

UNITED STATES PATENT OFFICE 2,644,121

SOLENOID CONTROLLED VALVE UNIT

John B. Parsons, Maumee, Ohio

Application June 16, 1949, Serial No. 99,516

3 Claims. (Cl. 317—191)

This invention relates to hydraulic regulator systems for operating vehicular parts, such as windows, seats and the like, but more particularly to solenoid controlled valve units permanently incorporated in cylinders, for example, in which pistons are reciprocably mounted.

In the mounting of solenoid controlled valve units within cylinders, considerable difficulty has been experienced in effecting a liquid-tight seal between the unit and the internal walls of the cylinder, such that the windings of the solenoid are sealed from the liquid. It is important that the seal be such that not only are the solenoid windings protected, but also that the rubber ring forming the seal is not placed under such pressure that its radial resilience is impaired during the assembly of the valve unit within the cylinder. A desideratum is a sealing device which is not only simple and inexpensive but lends itself to large quantity production and the employment of relatively unskilled labor, so that the number of assemblies rejected because of leakage or damaged solenoids, is kept at a minimum, and an object is accordingly to overcome these difficulties and produce a simple, efficient and inexpensive liquid-tight seal in such assembly.

Another object is to produce a solenoid valve unit of the above character which has new and improved features of construction and arrangement tending to prolong its useful life and facilitate assembly.

Other objects and advantages of the invention will hereinafter appear, and for purposes of illustration but not of limitation, an embodiment of the invention is shown on the accompanying drawings, in which Figure 1 is an elevation partly in section of a piston and cylinder assembly, a solenoid controlled valve unit being incorporated within the cylinder;

Figure 2 is a plan view of the sealing device forming a part of the solenoid controlled valve unit; and Figure 3 is a sectional view on the line 3—3 of Figure 2.

The illustrated embodiment of the invention comprises an elongate relatively thin-walled metallic cylinder 10, the upper end of which is closed by a cup-shaped end member 11 which has a flanged base, the end portion of the cylinder being crimped over as indicated at 12, to hold the base of the cup 11 in place. Within the cup may be a suitable packing sleeve (not shown) which is in the nature of a guide for the movement of a piston rod 13, the arrangement being such that air within the cylinder may be vented through the packing on the upstroke of the piston rod. On the inner end of the piston rod 13 is a piston 14 of any suitable or desired construction, creating a liquid-tight sliding contact with the internal walls of the cylinder 10 upon the admission of liquid under pressure to the under side of the piston as will hereinafter appear.

Closing the lower end of the cylinder 10 is a solenoid controlled valve unit generally indicated at 15. The unit 15 comprises a tube 16 of steel or other ferrous metal which is separate from but seats tightly within a die cast or non-ferrous housing 17. In practice, the motive fluid employed in the cylinder is a liquid such as brake fluid, and by employing a ferrous sleeve, it is found that the useful life of the assembly is prolonged over the die cast sleeve heretofore employed and which disintegrated to a certain extent due, it is believed, to the action of electrolysis.

Mounted on a ledge of the housing 17 adjacent the lower end of the tube 16 is a metallic washer 18 which fits inside of the lower end of the cylinder 10, the cylinder being crimped as indicated at 19 over the washer to retain the unit in position and close the lower end of the cylinder.

Wrapped about the tube or sleeve 16 are windings 20 which provide the solenoid, a lead 21 extending through the washer 18 providing a terminus for the same, 22 designating a ground connection for completing the circuit. At the opposite end of the solenoid windings 20 is a pair of metallic washers 23 and 24 which nicely fit the sleeve 16. Interposed between these washers is a sealing device 25 of rubber-like material hereinafter more fully described. Within the sleeve 16 is a stationary sleeve 26 which has a socket 27 terminating in an axially extending passage 28 at the upper end portion of the sleeve. For holding the sleeve 26 within the tube 16, a pin 29 extends through lateral holes in the tube 16 and stationary sleeve 26 and against the pin 29 bears the upper face of the washer 24.

Slidable vertically within the tube or sleeve 16 is a metallic sleeve 30 which is provided with a socket 31 and a helically coiled spring 32 has the lower end bearing against the bottom of the socket 31 and the upper end bearing against the bottom of the socket 27. The socket 31 in the armature 30 has an axial passage 33 which communicates with a lateral passage 34 above a valve nose 35 of rubber-like material. The rubber nose 35 normally closes the passage 36 which joins a lateral passage 37 leading to the outside of the housing 17. Thus it will be apparent that the coil spring 32 normally holds the valve 35 in its closed position, preventing liquid from flowing to or from the cylinder 10. Upon energizing the solenoid winding 20, the sleeve 30 is slid upwardly compressing the spring 32 and moving the valve 35 away from its seat, thereby to allow liquid to flow to or from the cylinder as is desired.

The sealing device 25 consists of a single annulus of rubber or rubber-like material which snugly fits not only the outer wall of the sleeve or tube 16 but also snugly engages the inner wall of the cylinder 10 thereby to effect a liquid-tight seal between the liquid in the cylinder above the ring 25 and the windings or solenoid 20. In order to militate against the rubber washer or ring 25 being squeezed tightly between the metallic washers 23 and 24, a series of rivets 38 are carried by the ring 25. Each of the rivets 38 has a head 39 at one end, the opposite end extending a short distance through and beyond the other face of the ring. Thus the head 39 bears against the under side of the washer 24 and spaces the ring a short distance therefrom and the projecting end of the rivet 38 abuts against the upper face of the metallic washer 23, thus spacing the lower face of the rubber ring 25 therefrom. In this instance, three equi-distantly spaced rivets 38 are employed, although the number may be varied as desired. The space thus afforded on opposite faces of the rubber-like ring 25 affords adequate space for the rubber to flow upon establishing sealing contact with the inner walls of the cylinder 10.

Manifestly, the sealing device is not only exceedingly simple and inexpensive, but is virtually foolproof and militates against troubles and objections heretofore encountered in assembling the solenoid controlled valve unit within the cylinder.

By way of explanation as to the purpose of the valve 35, the above described piston and cylinder assembly is particularly adapted for use in connection with hydraulically operated vehicle window regulators. In such instances, the piston rod 13 may be connected through suitable linkage to the lower edge portion of the window panel. The tube, a portion of which is shown connected to the fluid passage 37, leads to an electric motor driven pump (not shown). When such motor is energized, liquid is pumped from a reservoir (not shown) past the valve 35, the solenoid 20 having been simultaneously energized to unseat the valve 35 compressing the spring 32. Thus it will be manifest that liquid under pressure is forced into the cylinder 10 to force the piston 14 to move upwardly. On the other hand, when it is desired to lower the vehicle window, a coil spring (not shown) and which forms a part of the window regulator mechanism and which has been placed under tension during the raising of the window, pulls the window downwardly. At that time, it will be understood that the solenoid 20 alone is energized, unseating the valve 35 and the piston 14 forcing the liquid from the cylinder back to its reservoir to be available for the next window raising operation. In order to understand this operation fully, it should be mentioned that associated with the motor driven pump is a valve (not shown) which, when the pump operates, is unseated to allow liquid flow but when the pump stops, the valve is so positioned as to enable liquid from the cylinder to pass into the reservoir.

It is to be understood that numerous changes in details of construction, arrangement and operation may be effected without departing from the spirit of the invention especially as defined in the appended claims.

What I claim is:

1. A seal for isolating a portion of a solenoid controlled valve unit disposed in one end of a cylinder from the remainder of the cylinder, wherein said unit includes a stationary sleeve of lesser diameter than said cylinder coaxially disposed therein and wherein the portion of said unit to be isolated includes a solenoid winding disposed between the exterior of said sleeve and the interior of said cylinder, said seal comprising a pair of spaced metallic washers surrounding said sleeve and adapted to be disposed adjacent one end of said winding, a rubber-like annulus disposed between said washers, the inner and outer diameters of said annulus sealingly engageable with the exterior and interior of said sleeve and cylinder, respectively, and a plurality of headed rivets extending axially through said annulus, the heads of said rivets being disposed between one face of the annulus and one of said washers, the shank ends of said rivets projecting beyond the opposite face of said annulus a slight distance and engaging the other of said washers, whereby to prevent axially compressive deformation of said annulus by said washers.

2. A seal for isolating a portion of a solenoid controlled valve unit disposed in one end of a cylinder from the remainder of the cylinder, wherein said unit includes a stationary sleeve of lesser diameter than said cylinder coaxially disposed therein and wherein the portion of said unit to be isolated includes a solenoid winding disposed between the exterior of said sleeve and the interior of said cylinder, said seal comprising a pair of spaced metallic washers surrounding said sleeve and adapted to be disposed adjacent one end of said winding, a rubber-like annulus disposed between said washers, the inner and outer diameters of said annulus sealingly engageable with the exterior and interior of said sleeve and cylinder, respectively, a plurality of headed rivets extending axially through said annulus, the heads of said rivets being disposed between one face of the annulus and one of said washers, the shank ends of said rivets projecting beyond the opposite face of said annulus a slight distance and engaging the other of said washers, whereby to prevent axially compressive deformation of said annulus by said washers, and a stop on said sleeve against which an outer face of one of said metallic washers bears, whereby to prevent axial movement of said seal therepast.

3. A seal for isolating a portion of a solenoid controlled valve unit disposed in one end of a cylinder from the remainder of the cylinder, wherein said unit includes a stationary sleeve of lesser diameter than said cylinder coaxially disposed therein and wherein the portion of said unit to be isolated includes a solenoid winding disposed between the exterior of said sleeve and the interior of said cylinder, said seal comprising a pair of spaced metallic washers surrounding said sleeve and disposed adjacent one end of said winding, a rubber-like annulus disposed between said washers, the inner and outer diameters of said annulus sealingly engaging the exterior and interior of said sleeve and cylinder, respectively, and a plurality of metallic spacers extending axially through said annulus and projecting a short distance beyond each face thereof, the ends of said spacers projecting beyond the faces of said annulus engaging said washers, whereby to prevent axially compressive deformation of said annulus by said washers.

JOHN B. PARSONS.

References Cited in the file of this patent

UNITED STATES PATENTS

| Number | Name | Date |
|---|---|---|
| 2,267,515 | Wilcox et al. | Dec. 23, 1941 |
| 2,279,243 | Parsons | Apr. 7, 1942 |
| 2,391,017 | Grontkowski | Dec. 18, 1945 |
| 2,468,943 | Parsons | May 3, 1949 |
| 2,479,398 | Parsons | Aug. 16, 1949 |